US009400927B2

(12) United States Patent  (10) Patent No.: US 9,400,927 B2
Suzuki et al.  (45) Date of Patent: Jul. 26, 2016

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventors: Seiji Suzuki, Yokohama (JP); Motoyuki Takaai, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/716,224

(22) Filed: May 19, 2015

(65) Prior Publication Data

US 2016/0162732 A1   Jun. 9, 2016

(30) Foreign Application Priority Data

Dec. 3, 2014   (JP) ................................. 2014-244773

(51) Int. Cl.
 *G06K 9/36* (2006.01)
 *G06K 9/00* (2006.01)
 *G06T 7/00* (2006.01)

(52) U.S. Cl.
 CPC .......... *G06K 9/00469* (2013.01); *G06T 7/0081* (2013.01); *G06T 2207/20021* (2013.01); *G06T 2207/30176* (2013.01)

(58) Field of Classification Search
 CPC ............... G06T 3/00; G06T 3/40; G06T 3/60; G06T 1/60; G06T 7/0081; G06T 2207/20021; G06T 2207/30176; G06F 17/148
 See application file for complete search history.

(56) References Cited

U.S. PATENT DOCUMENTS

| 7,072,891 | B2 * | 7/2006 | Lee ...................... G06K 9/6218 |
| 7,348,990 | B2 * | 3/2008 | Yamauchi ............... G06T 15/04 345/426 |
| 7,433,885 | B2 * | 10/2008 | Jones ................ G06F 17/30554 |
| 7,751,621 | B1 * | 7/2010 | Jacobsen .............. G06K 9/4647 382/173 |
| 8,812,369 | B2 * | 8/2014 | Jeong ..................... G06Q 30/00 705/26.1 |
| 2007/0244915 | A1 | 10/2007 | Cha et al. |
| 2012/0207387 | A1 * | 8/2012 | Pereira .............. G06F 17/30858 382/168 |

FOREIGN PATENT DOCUMENTS

| EP | 1024437 A2 | 8/2000 |
| JP | H10-171823 A | 6/1998 |
| JP | 2003-288352 A | 10/2003 |
| JP | 2003-323454 A | 11/2003 |
| JP | 2004-086262 A | 3/2004 |

OTHER PUBLICATIONS

Apr. 1, 2016 Office Action issued in Australian Application No. 2015204339.

* cited by examiner

*Primary Examiner* — Amir Alavi
(74) *Attorney, Agent, or Firm* — Oliff PLC

(57) ABSTRACT

An information processing apparatus includes: an arrangement unit that arranges documents within a multidimensional space in accordance with features of the documents; a clipping unit that clips a region in which the documents are distributed, from the multidimensional space in which the documents are arranged by the arrangement unit; an extraction unit that extracts a vector indicating a closed curved surface which is the region clipped by the clipping unit; and a retrieval unit that retrieves information corresponding to the vector extracted by the extraction unit, from a storage unit that stores the vector in the multidimensional space in association with information indicating meaning of the vector.

5 Claims, 8 Drawing Sheets

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-244773 filed on Dec. 3, 2014.

BACKGROUND

Technical Field

The present invention relates to an information processing apparatus and a non-transitory computer readable medium.

SUMMARY

An aspect of the present invention provides an information processing apparatus including: an arrangement unit that arranges documents within a multidimensional space in accordance with features of the documents; a clipping unit that clips a region in which the documents are distributed, from the multidimensional space in which the documents are arranged by the arrangement unit; an extraction unit that extracts a vector indicating a closed curved surface which is the region clipped by the clipping unit; and a retrieval unit that retrieves information corresponding to the vector extracted by the extraction unit, from a storage unit that stores the vector in the multidimensional space in association with information indicating meaning of the vector.

BRIEF DESCRIPTION OF THE DRAWINGS

Exemplary embodiment(s) of the present invention will be described in detail based on the following figures, wherein.

DETAILED DESCRIPTION

Hereinafter, an example of a preferred embodiment in realizing the present invention will be described with reference to the accompanying drawings.

Figure 1:
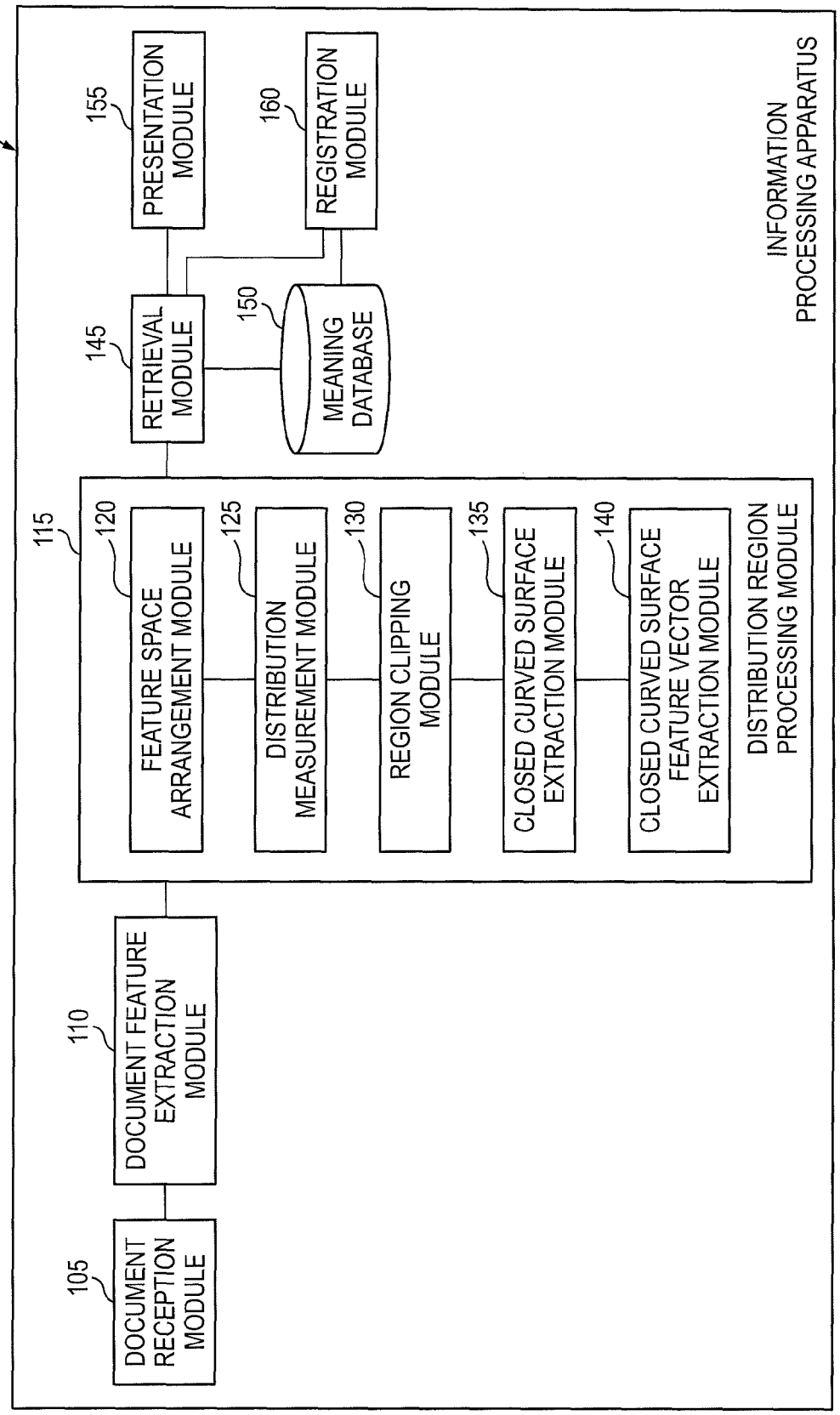
FIG. 1 is a diagram illustrating the configuration of a conceptual module regarding a configuration example according to an exemplary embodiment of the present invention.

FIG. 1 is a diagram illustrating the configuration of a conceptual module regarding a configuration example according to an embodiment of the invention.

Meanwhile, a term "module", as used herein, generally refers to a component such as software (computer program) or hardware which is logically separable. Accordingly, a module in the present embodiment refers to not only a module in a computer program but also a module in a hardware configuration. For this reason, in the present embodiment, computer programs for causing a computer to function as the modules (a program for causing a computer to perform individual procedures, a program for causing a computer to function as individual units, and a program for causing a computer to realize individual functions), a system, and a method will also be described. For convenience of description, "to store", "to cause a device to store", and expressions equivalent thereto are used. When an embodiment is carried out as a computer program, these expressions indicate that the computer program causes a storage device to store information or the computer program controls a storage device to store information. In addition, modules and functions may have one-to-one correspondence. In implementations, one module may be constituted by one program, plural modules may be constituted by one program, or conversely, one module may be constituted by plural programs. In addition, plural modules may be executed by one computer, or one module may be executed by plural computers in a distributed or parallel environment. Meanwhile, one module may include another module. Hereinafter, a term "connection" refers to physical connection and logical connection (such as data exchange, reference relations between instructions and between pieces of data). Further, a term "predetermined" refers to a state where something is determined prior to target processing. The term "predetermined" includes the meaning that something is determined in accordance with the condition and the state at the time or the condition and the state up to the point before and even after a process according to an embodiment starts as long as the decision is made prior to the target processing. In a case where plural "predetermined values" are present, the values may be different from each other, or two or more values (including all values) may be the same. In addition, the expression of "in a case where something is A, do B" means "it is determined whether or not something is A, and in a case where it is determined that something is A, do B", which does not include a case where it is not necessary to determine whether or not something is A.

In addition, a system or an apparatus may have a configuration in which plural computers, hardware, apparatuses or the like are connected to each other by a communication unit such as a network (including of one-to-one communication connection), or may have a configuration realized by a single computer, hardware, apparatus, or the like. The terms "apparatus" and "system" may be used to have the same meaning. It is needless to say that the term "system" does not include the meaning of a social mechanism (social system) which is an arrangement made by humans.

In addition, each time each module performs a process or each time a module performs each of plural pieces of processing, target information is read from a storage device for each processing, and a result of the process is written in the storage device after the processing is performed. Accordingly, description regarding the reading of information from the storage device before the processing and the writing of information into the storage device after the processing are sometimes omitted. Examples of the storage device in this case may include a hard disk, a random access memory (RAM), an external storage medium, a storage device via a communication line, and a register within a central processing unit (CPU).

An information processing apparatus 100 according to the present embodiment is used to retrieve the meaning of a set of documents arranged in a feature space from the set of documents. As illustrated in the example of FIG. 1, the information processing apparatus includes a document reception module 105, a document feature extraction module 110, a distribution region processing module 115, a retrieval module 145, a meaning database 150, a presentation module 155, and a registration module 160.

The document reception module 105 is connected to the document feature extraction module 110. The document reception module 105 receives a set of documents (a document group having one or more documents). Here, the term "document" may include a figure, a movie, a sound, and the like in addition to a document in which characters are written. Meanwhile, the set of documents received may be a set of documents accumulated in a storage device (including a storage device connected through a network, in addition to a storage device built into a computer), a set of documents within a folder, a retrieval result obtained by a retrieval expression designated by a user, or the like.

The document feature extraction module 110 is connected to the document reception module 105 and the distribution region processing module 115. The document feature extraction module 110 extracts features of the document received by the document reception module 105 from the document. The features may be attributes of the document such as a creation date, a creator, and a department that the creator belongs to, may be wording (for example, a result obtained by performing morpheme analysis on the document) such as a word within the document, may be the structure (for example, the number of figures and the number of paragraphs) of the document, or the like.

The distribution region processing module 115 includes a feature space arrangement module 120, a distribution measurement module 125, a region clipping module 130, a closed curved surface extraction module 135, and a closed curved surface feature vector extraction module 140, and is connected to the document feature extraction module 110 and the retrieval module 145. The distribution region processing module 115 extracts the distribution of documents arranged in a feature space.

The feature space arrangement module 120 is connected to the distribution measurement module 125. The feature space arrangement module 120 arranges documents within a feature space which is a multidimensional space, in accordance with the features extracted by the document feature extraction module 110. As an axis in the feature space, a predetermined feature may be used as the axis, the axis may be generated using a clustering method, or a facet or the like in retrieval used at the time of collecting the documents received by the document reception module 105 may be used as the axis. Specifically, a multidimensional space array having dimensions corresponding to the number of axes is prepared, and the arrangement (mapping) in the multidimensional space array may be performed using the techniques disclosed in JP-A-2003-323454, JP-A-2004-086262, JP-A-H10-171823, JP-A-2003-288352, or the like. Meanwhile, when a facet is used as the axis, some facets may be required to be sorted in accordance with a predetermined reference. For example, time information such as a creation date and time corresponds thereto. In addition, the arrangement of facets on at least an axis is required to have reproducibility. For example, time information may be changed in ascending order or descending order, but may never become random.

The distribution measurement module 125 is connected to the feature space arrangement module 120 and the region clipping module 130. The distribution measurement module 125 measures the distribution of documents from a feature space where the documents are arranged by the feature space arrangement module 120. Specifically, for example, the distribution measurement module measures distribution density in a unit space of the feature space.

The region clipping module 130 is connected to the distribution measurement module 125 and the closed curved surface extraction module 135. The region clipping module 130 clips a region (hereinafter, also referred to as a cluster) where the documents are distributed from the feature space where the documents are arranged by the feature space arrangement module 120. Specifically, for example, when the distribution density measured by the distribution measurement module 125 satisfies a predetermined condition, it may be said that the documents are present in the distribution. The term "predetermined condition", as used herein, may refer to, for example, a condition in which the distribution density is greater than a predetermined threshold value or equal to or greater than the predetermined threshold value, or may be a condition in which a location having a difference in distribution which is greater than or which is equal to or greater than a predetermined difference, as compared with surrounding distribution density, is extracted as a boundary between distributions.

Meanwhile, as processing performed by the distribution measurement module 125 and the region clipping module 130, blurring processing (convolution processing using a filter, or the like) in image processing, and binarization processing may be used. The existing technique equivalent to the above-mentioned processing can be used. Meanwhile, as the binarization processing, advanced binarization (error diffusion method or the like) used in a printer and the like, a meta-ball used in 3D graphics and the like, and the like may be used, in addition to binarization using a simple threshold value.

The closed curved surface extraction module 135 is connected to the region clipping module 130 and the closed curved surface feature vector extraction module 140. The closed curved surface extraction module 135 calculates an n-th closed curved surface indicating the region clipped by the region clipping module 130.

The closed curved surface feature vector extraction module 140 is connected to the closed curved surface extraction module 135. The closed curved surface feature vector extraction module 140 extracts a feature vector from the n-th closed curved surface which is calculated by the closed curved surface extraction module 135.

In addition, the closed curved surface feature vector extraction module 140 may generate an expression indicating the n-th closed curved surface which is the region clipped by the region clipping module 130, may extract a coefficient of the expression as an element of the feature vector, and may normalize the feature vector (for example, processing for setting a ratio of coefficients of the respective variables). When performing collation with the meaning database 150 at the latter stage, the shape is digitized in any form, and accordingly, the meaning database 150 is referred to. For this reason, a mathematical model capable of roughly specifying a shape is prepared, and the coefficient thereof is obtained by fitting (the same as regression analysis or the like). A coefficient of an expression becomes a numerical sequence having a fixed length according to the number of dimensions of an arrangement space by such processing. The normalization is performed in order to make sets of documents having different sizes but having the same distribution recognized as having the same feature.

Meanwhile, as processing performed by the closed curved surface extraction module 135 and the closed curved surface feature vector extraction module 140, an image recognition technique may be used. The feature vector indicating the region clipped by the region clipping module 130 may be extracted using, for example, a face image recognition technique.

The retrieval module 145 is connected to the distribution region processing module 115, the meaning database 150, the presentation module 155, and the registration module 160. The retrieval module 145 retrieves information corresponding to the feature vector extracted by the closed curved surface feature vector extraction module 140, from the meaning database 150. Meanwhile, in retrieval using the feature vector as a key, the retrieval may be performed through complete matching, or the retrieval may be performed using a close value instead of complete matching and plural candidates may be extracted. For example, inner products of feature vectors registered in the meaning database 150 and a feature vector to be compared may be obtained, and higher values may be scored for the larger inner products in descending order.

The meaning database 150 is connected to the retrieval module 145 and the registration module 160. The meaning database 150 stores a feature vector in a target multidimensional space in association with information indicating the meaning of the feature vector. In other words, meaning information corresponding to the feature vector can be retrieved using the feature vector as a key. Specifically, the meaning database is constituted by a table in which the feature vector and the meaning information are stored as a pair.

The presentation module 155 is connected to the retrieval module 145. The presentation module 155 presents information retrieved by the retrieval module 145.

The registration module 160 is connected to the retrieval module 145 and the meaning database 150. The registration module 160 receives information corresponding to a vector when the information corresponding to the vector cannot be retrieved by the retrieval module 145 and when a user desires to newly add meaning information, and registers the information corresponding to the vector in the meaning database 150. The information corresponding to the vector is input by a user. The user inputs meaning information of a target region through an operation using a keyboard, a mouse, a touch panel, a sound, a line of sight, gesture, or the like. At that time, it is also possible to present the closest value (meaning information) which is registered in the meaning database 150 to the user, as a candidate. The user inputs the meaning information with reference to the meaning information.

Figure 2:
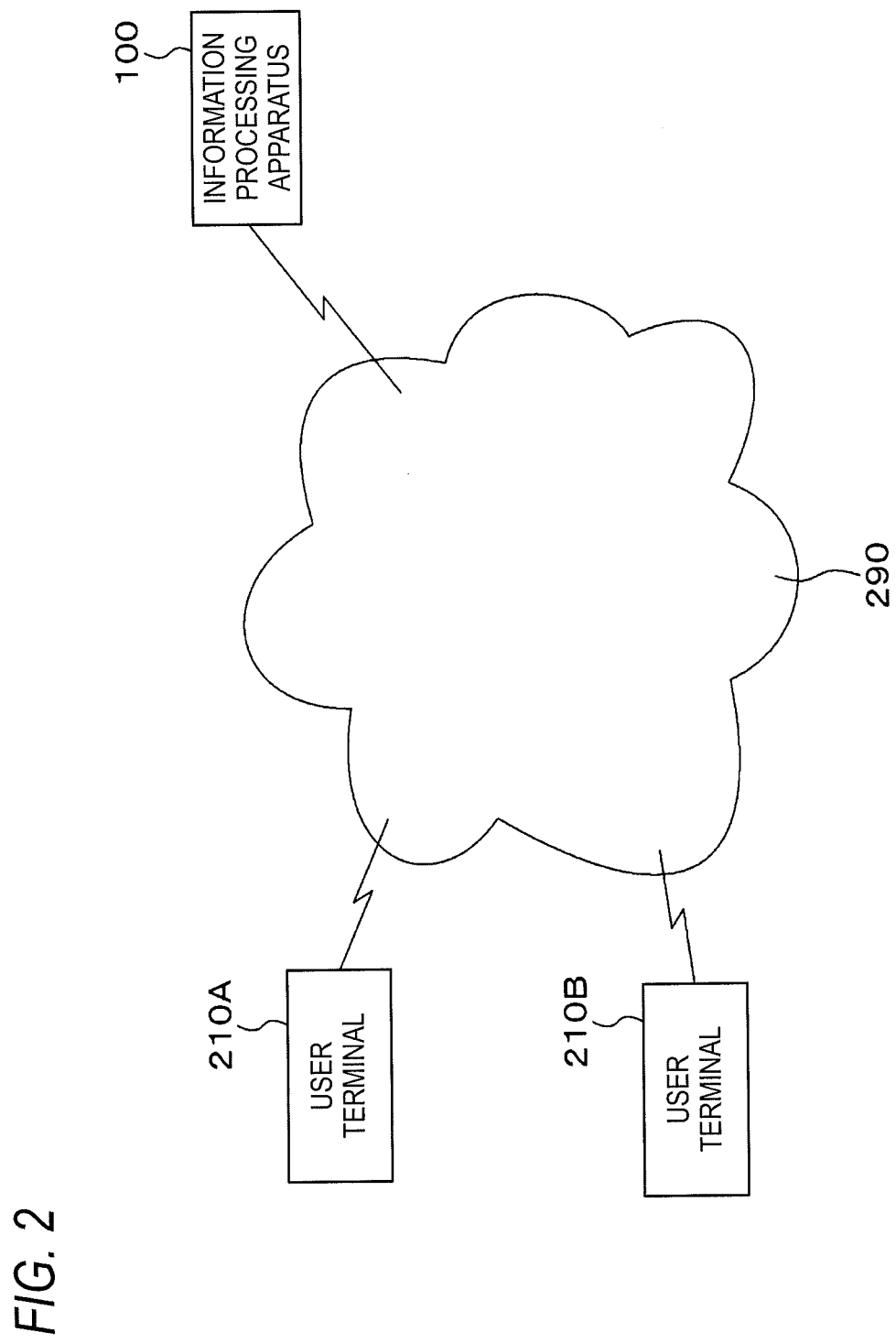
FIG. 2 is a diagram illustrating an example of the configuration of a system according to the embodiment.

FIG. 2 is a diagram illustrating an example of the configuration of a system according to an embodiment of the invention.

The information processing apparatus 100, a user terminal 210A, and a user terminal 210B are connected to each other through a communication line 290. The communication line 290 may be a wireless line, a wired line, or a combination thereof, or may be, for example, the Internet as communication infrastructure.

A set of documents is transferred to the information processing apparatus 100 by a user performing an operation such as retrieval on a user terminal 210. The information processing apparatus 100 extracts the meaning of the set of documents and transfers the meaning to the user terminal 210. The user terminal 210 presents the result thereof to the user.

In addition, a user who is an expert may register meaning information of the set of documents in advance using the user terminal 210A, and then a general user may extract the meaning information of the set of documents using the user terminal 210B.

Meanwhile, the information processing apparatus 100 may be configured as a stand-alone type by being built into the user terminal 210. A document arrangement service for presenting document retrieval and analysis information obtained from the retrieval result thereof may be provided by constructing the information processing apparatus 100 as a ground.

Figure 3:
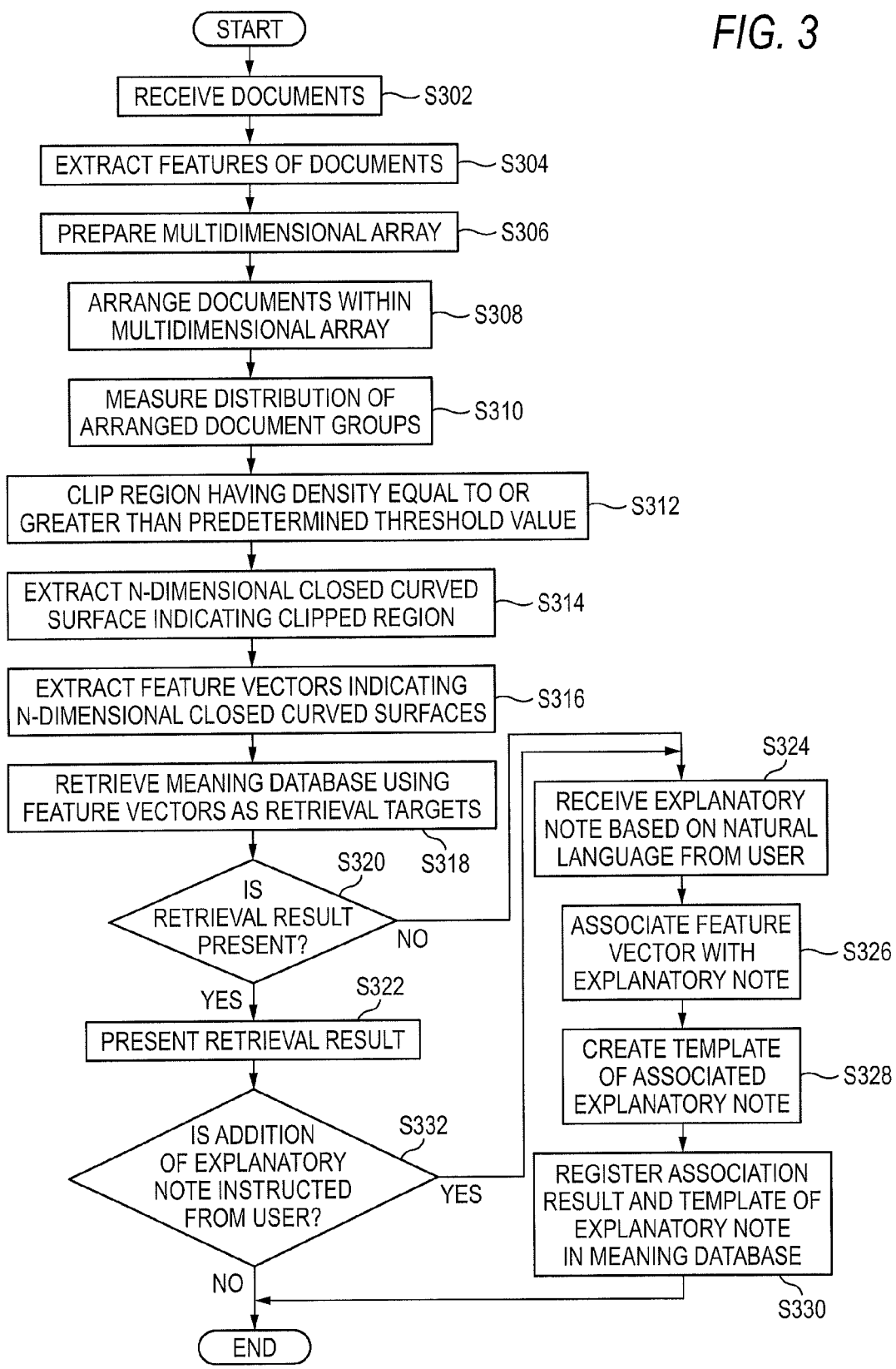
FIG. 3 is a flow chart illustrating an example of processing according to the embodiment.

FIG. 3 is a flow chart illustrating an example of processing according to an embodiment of the invention.

In step S302, the document reception module 105 receives a set of documents.

In step S304, the document feature extraction module 110 extracts features of the documents.

In step S306, the feature space arrangement module 120 prepares a multidimensional array.

Figure 4:
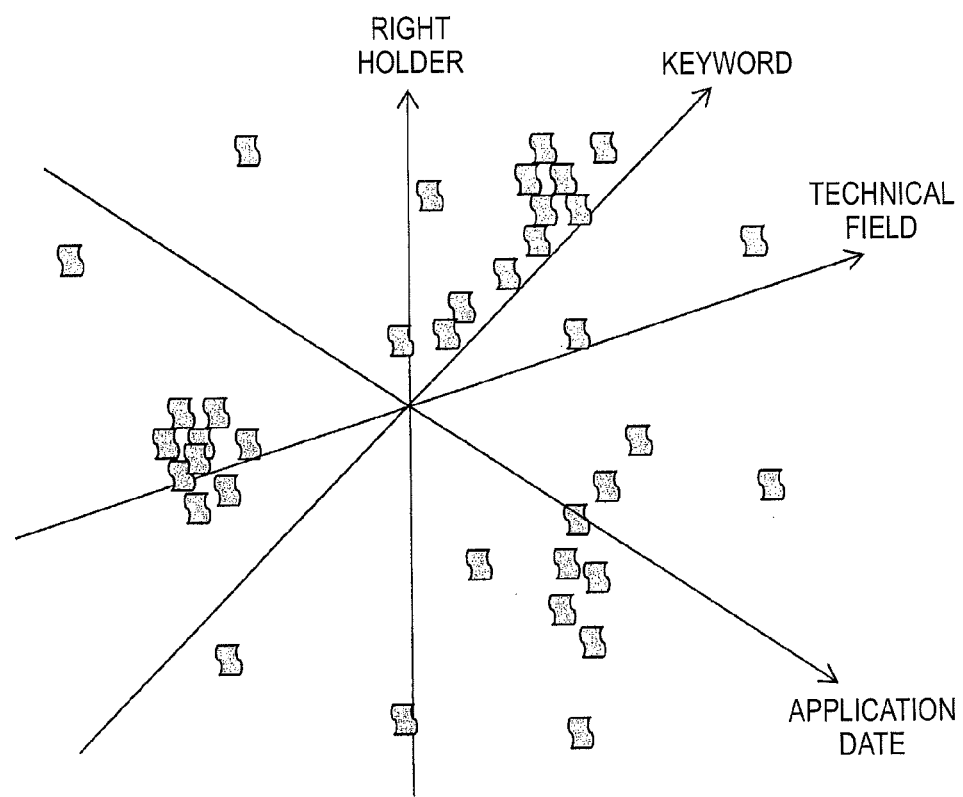
FIG. 4 is a diagram illustrating an example of processing according to the embodiment.

In step S308, the feature space arrangement module 120 arranges the documents within the multidimensional array. FIG. 4 illustrates an example in which a set of published patent applications (documents) in a multidimensional space which is a feature space. In this example, a four-dimensional space using a right holder, a keyword, a technical field, and an application date, which are facets, as axes, and a published patent application is arranged therein.

In step S310, the distribution measurement module 125 measures the distribution of arranged document groups.

Figure 5:
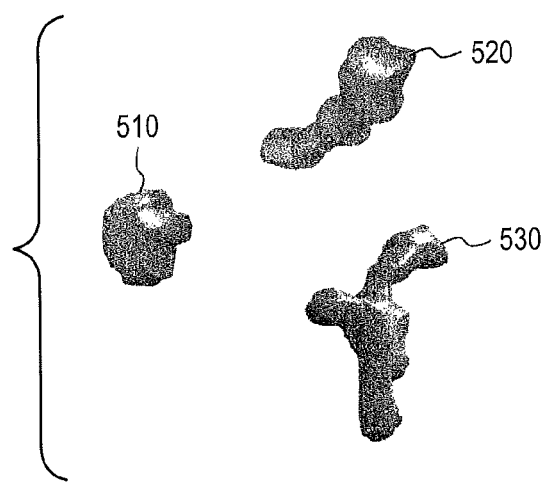
FIG. 5 is a diagram illustrating an example of processing according to the embodiment.

In step S312, the region clipping module 130 clips a region having density equal to or greater than a predetermined threshold value. FIG. 5 illustrates an example of a clipped region. Here, regions 510, 520, and 530 have a three-dimensional shape, and have a shape in a dimension of a feature space. Pieces of processing which are the same as blurring processing and binarization processing are performed on the distribution arranged in a multidimensional space to thereby extract the regions 510, 520, and 530.

Figure 6:
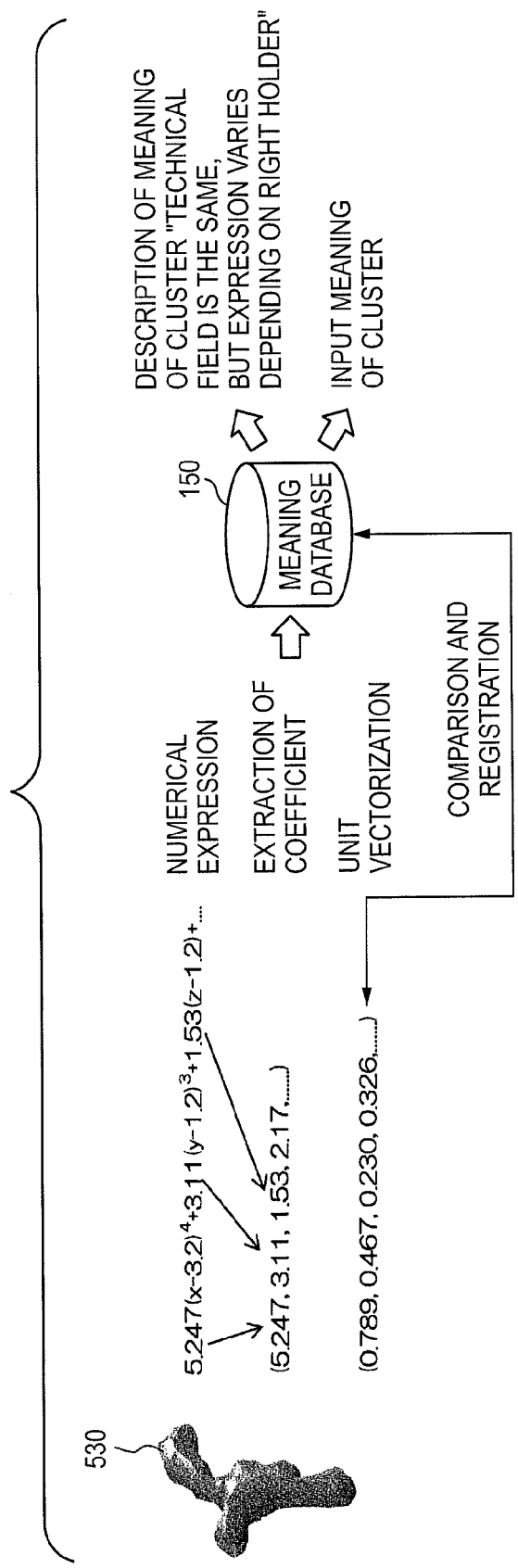
FIG. 6 is a diagram illustrating an example of processing according to the embodiment.

In step S314, the closed curved surface extraction module 135 extracts an n-dimensional closed curved surface indicating a clipped region. In step S312, an expression indicating the shape of the clipped region is created. For example, a well-known technique such as regression analysis may be used. FIG. 6 illustrates an example in which the shape of the region 530 is made into a numerical expression.

In step S316, the closed curved surface feature vector extraction module 140 extracts a feature vector indicating n-dimensional closed curved surfaces. Coefficients of variables (x, y, z, and the like) indicating axes of the numerical expression are extracted as the feature vector. FIG. 6 illustrates an example in which coefficients are extracted from the numerical expression. In this example, "5.247" which is the coefficient of $x^4$, "3.11" which is the coefficient of $y^3$, "1.53" which is the coefficient of z, and the like are extracted. The coefficients are treated as a vector, and the vector is normalized to a unit vector of length 1 as illustrated in an example of FIG. 6.

In step S318, as illustrated in an example of FIG. 6, the retrieval module 145 retrieves the meaning database 150 using the feature vector as a retrieval target.

In step S320, the retrieval module 145 determines whether or not the meaning database 150 includes a retrieval result. When the meaning database includes a retrieval result, the flow proceeds to step S322. When the meaning database does not include a retrieval result, the flow proceeds to step S324.

In step S322, the presentation module 155 presents a retrieval result. As illustrated in an example of FIG. 6, a description of meaning of a cluster (distribution) of "technical field is the same, but expression varies depending on right holder" which is a retrieval result is displayed.

In step S324, the registration module 160 receives an explanatory note (meaning information) based on a natural language from a user. As illustrated in an example of FIG. 6, the meaning of the cluster is input. Meanwhile, a user capable of performing the input may be only an expert. For example, it may be determined whether or not the user has an attribute of position classification for which the input of a description is permitted.

In step S326, the registration module 160 associates the feature vector with the explanatory note.

In step S328, the registration module 160 creates a template of the associated explanatory note.

In step S330, the registration module 160 registers an association result and the template of the explanatory note in the meaning database 150.

In step S332, the registration module 160 determines whether or not the addition of an explanatory note is instructed from a user. When the addition is instructed, the flow proceeds to step S324. Otherwise, the flow is terminated (step S399). When a result of retrieval (interpretation of the distribution of documents) is not satisfied in spite of the successful retrieval (Yes in step S320), a new interpretation can be added.

The meaning database 150 has a dictionary in which the feature vector (pattern of document distribution) is associated with the explanatory note based on a natural language. For example, the feature vector may be associated with the template of an explanatory note. In this template, a portion of a name (facet) of an axis is constituted by an argument, and a facet is embedded into the portion to thereby form an explanatory note.

Here, for example, patent retrieval is as follows. Feature vector (0.789, 0.467, 0.230, 0.326, ... )

An explanatory note corresponding to the feature vector is "<technical field> is the same, but <expression> varies depending on <right holder>".

The inside of <> is constituted by a different keyword in a different retrieval field. The surrounding portion other than <> is a fixed template. For example, in a case of the retrieval of a performance evaluation report of a factory, an explanatory note of "<product model number: xxx-yyy-12345> is the same, but <such and such performance> varies depending on <operator>" is presented with respect to the same feature vector. In this case, axes of a feature space include a product model number, an operator, performance, a supplier, and the like.

Figure 7:
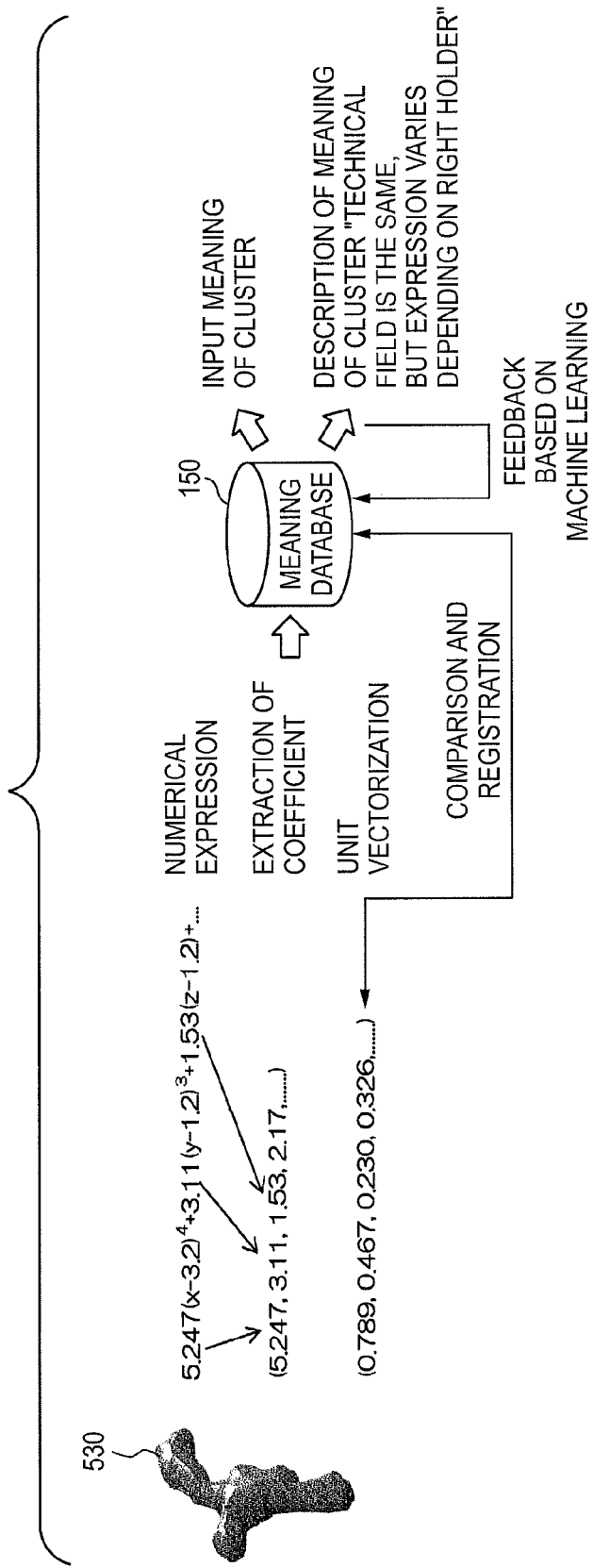
FIG. 7 is a diagram illustrating another example of processing according to the embodiment.

FIG. 7 is a diagram illustrating an example of another processing according to an embodiment of the invention. In the processing, feedback based on machine learning is performed on the above-mentioned example of FIG. 6. Alternatively, the processing is processing for generating data within the meaning database 150 at an initial stage.

Most parts of FIG. 7 illustrate pieces of processing which are the same as those of FIG. 6. In FIG. 7, the meaning of a cluster is input. At this time, as illustrated in an example of FIG. 7, an explanatory note corresponding to feature vector similar to the extracted feature vector is presented. For example, evaluation is performed using inner products of the feature vector and a feature vector registered in the meaning database 150, and a predetermined number of high-ranking explanatory notes are output in the order of scores. The explanatory notes are the enumeration of probable interpretations regarding clusters of target documents.

Machine learning is performed based on interpretation which is finally selected by a user or interpretation which is newly input, among the interpretations, to thereby adjust the weighting of a meaning database (FIG. 7). For example, a feature vector, a weighting, and an explanatory note, which are associated with each other, are stored in the meaning database 150 as follows; a feature vector of (0.784, 0.50, 0.213, ... ), a weighting of 0.8, a template note of "<%1> is the same, but <%3> varies depending on <%2>", a feature vector of (0.245, 0.432, 0.33, ... ), a weighting of 0.4, a template note of "it seems that affirmative <%1> and critical <%1> are compared with each other". Here, <%1>, <%2>, and <%3> indicate arbitrary keywords.

Figure 8:
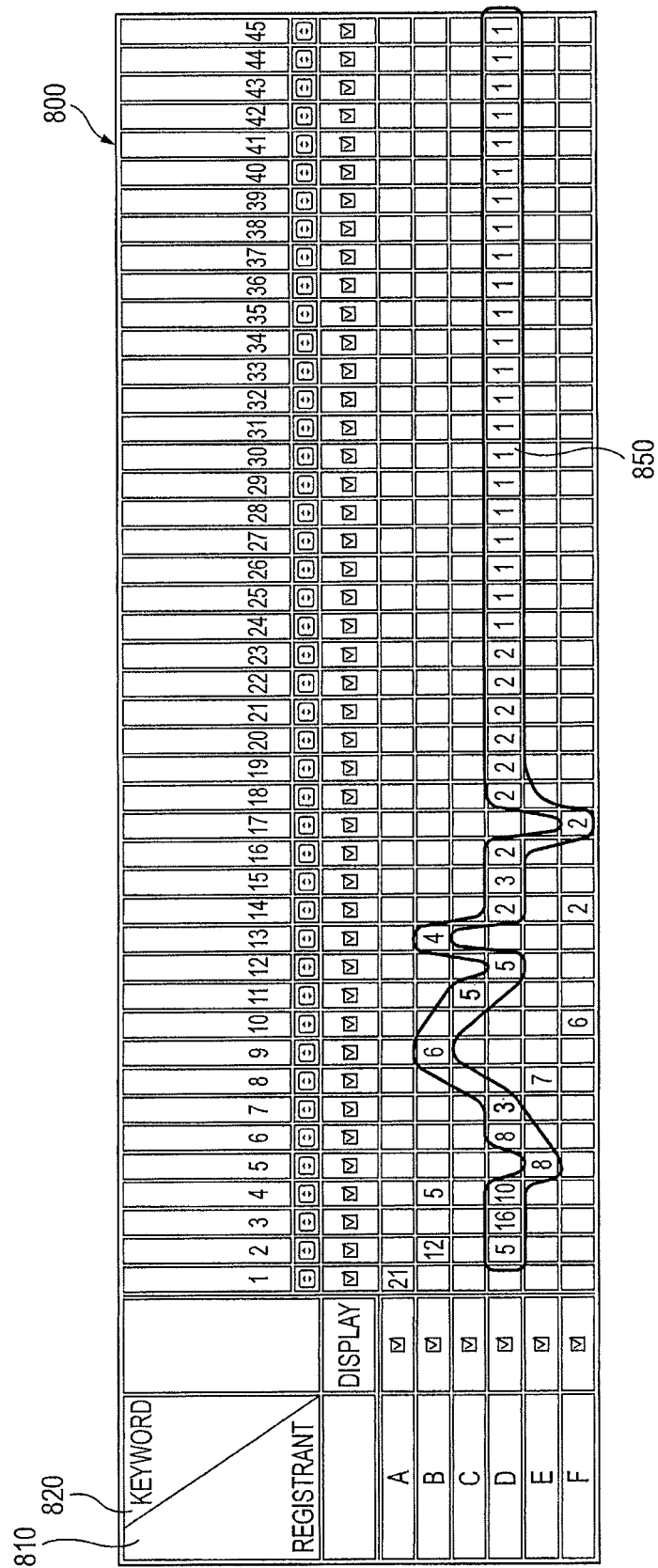
FIG. 8 is a diagram illustrating an example of processing according to the embodiment.

FIG. 8 is a diagram illustrating an example of processing according to an embodiment of the invention. A mapping space 800 illustrates an example of processing according to an embodiment of the invention. The mapping space 800 is configured as a two-dimensional feature space in which a horizontal axis represents a keyword included in a document (keyword axis 820, "1", "2", and the like in FIG. 8) and a vertical axis represents a registrant of the document (registrant axis 810, "A", "B", and the like in FIG. 8).

In this example, a document including a keyword of "first" and its similar document are mapped in a two-dimensional space. A laterally-long region like a cluster 850 is shown. Mr. D constituting the center of the cluster 850 is a superior officer, and receives a large number of reports regarding the "first" from a subordinate to thereby create a document. However, it can be understood that there are some missing parts. Consequently, in the present embodiment, an explanatory note which is a retrieval result of "viewpoints of '1', '5', '8', '9', '10', '11', '13', and '17' may be lacked in document in which Mr. D is registered" is presented as meaning information from features of the cluster 850 and features of the axes. It is possible to check whether the lack occurs actually or intentionally by the explanatory note.

Figure 9:
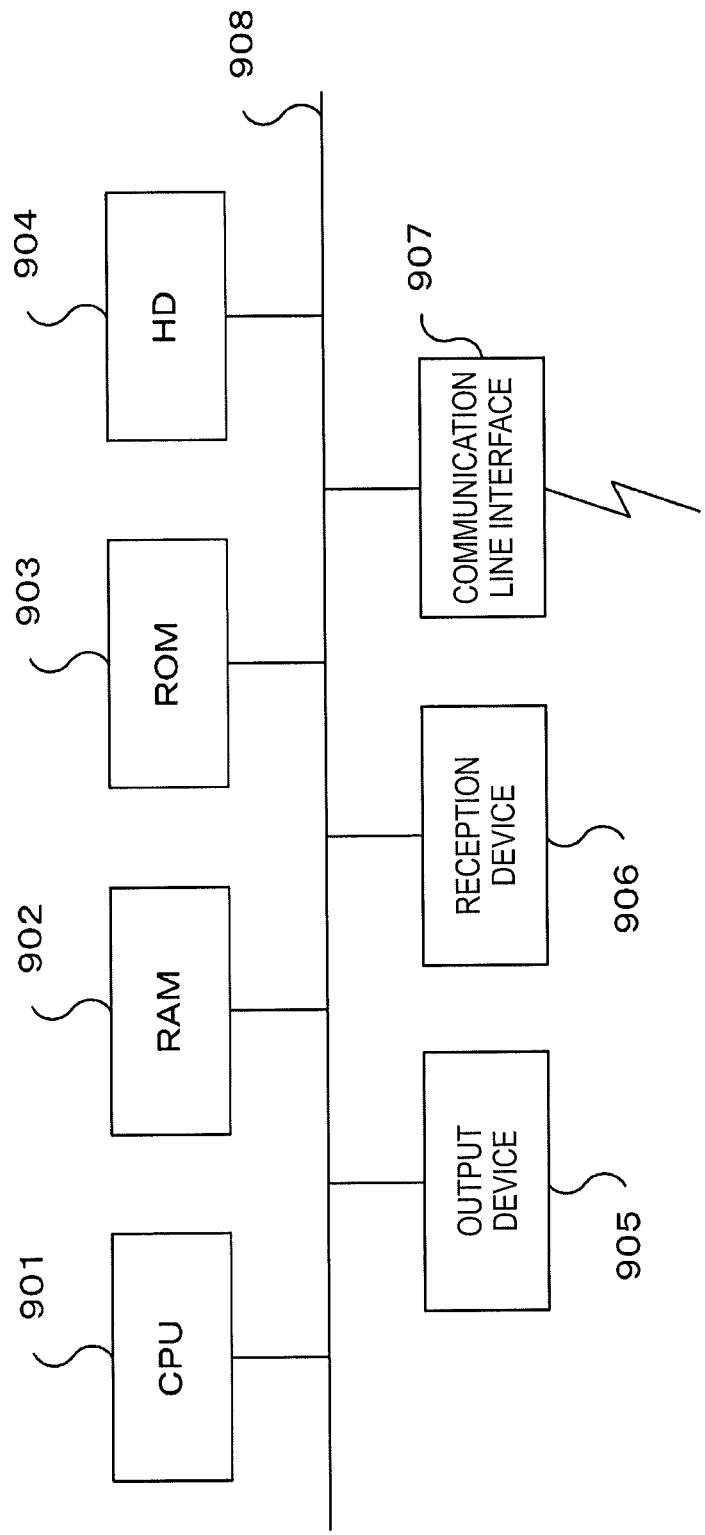
FIG. 9 is a block diagram illustrating an example of a computer hardware configuration that is realized in the embodiment.

Meanwhile, a hardware configuration of a computer for executing the program according to the present embodiment is a general computer as illustrated in FIG. 9. Specifically, the computer is a computer and the like which can become a personal computer or a server. In other words, as a specific example, a CPU 901 is used as a processing unit (computation unit), and a RAM 902, a ROM 903, and an HD 904 are used as storage devices. For example, a hard disk and a solid state drive (SSD) may be used as the HD 904. The computer is constituted by the CPU 901 that executes programs of the document reception module 105, the document feature extraction module 110, the distribution region processing module 115, the feature space arrangement module 120, the distribution measurement module 125, the region clipping module 130, the closed curved surface extraction module 135, the closed curved surface feature vector extraction module 140, the retrieval module 145, the presentation module 155, the registration module 160, and the like, the RAM 902 that stores the programs and data, the ROM 903 that stores a program for starting up the computer, and the like, the HD 904 which is an auxiliary storage device (may be a flash memory or the like) having a function as the meaning database 150, a reception device 906 that receives data on the basis of a user's operation using a keyboard, a mouse, a touch panel, or the like, an output device 905 such as a CRT or a liquid crystal display, a communication line interface 907 for connection to a communication network such as a network interface card, and a bus 908 for connecting them and transmitting and receiving data. Plural computers may be connected to each other through a network.

For the parts based on a computer program in the above-mentioned embodiment, a system having the present hardware configuration is caused to read the computer program which is software, and software and hardware resources operate in cooperation with each other, thereby realizing the above-mentioned embodiment.

Meanwhile, the hardware configuration illustrated in FIG. 9 shows one configuration example. The hardware configuration in the present embodiment is not limited to the configuration illustrated in FIG. 9, and may be a configuration capable of executing the modules described in the present embodiment. For example, some modules may be constituted by dedicated hardware (for example, an application specific integrated circuit (ASIC)). Some modules may be included in an external system and may be connected to each other through a communication line. Further, plural systems shown in FIG. 9 may be connected to each other through a communication line so as to operate in cooperation with each other. Particularly, in addition to a personal computer, the system may be incorporated in an information appliance, a copier, a facsimile, a scanner, a printer, a multifunctional machine (image processing apparatus having two or more functions of a scanner, a printer, a copier, a facsimile, and the like), and the like.

In the above-mentioned embodiment, a multidimensional array is used in order to express a multidimensional space. However, the invention is not limited thereto, and a different data structure may be used. For example, a graph structure, a tree structure, or the like may be used.

Meanwhile, the above-mentioned program may be stored in a recording medium and provided, or may be provided through a communication unit. In this case, the above-mentioned program may be regarded as the invention of, for example, a "computer readable medium storing a program".

The "computer readable medium storing a program" refers to a recording medium that can be read by a computer on which the program is recorded, wherein the recording medium is used for installation, execution, distribution, and the like of the program.

Meanwhile, examples of the recording medium include the following: digital versatile discs (DVD) including "a DVD-R, a DVD-RW, a DVD-RAM, and the like" which are standards established by the DVD forum, and including "a DVD+R, a DVD+RW, and the like" which are standards established by the DVD+RW forum; compact discs (CD) including a read only memory (CD-ROM), a CD recordable (CD-R), and a CD rewritable (CD-RW), and the like; a Blu-ray (registered trademark) disc, a magneto-optical disk (MO), a flexible disk (FD), a magnetic tape, a hard disk, a read only memory (ROM), an electrically erasable programmable read-only memory (EEPROM (registered trademark)), a flash memory, a random access memory (RAM), a secure digital (SD) memory card; and the like.

The above-mentioned program or a portion thereof may be recorded on the recording medium, and may be stored, distributed, and the like. In addition, the program may be transmitted by communication using a transmission medium such as a wired network which is used in, for example, a local area network (LAN), a metropolitan area network (MAN), a wide area network (WAN), the Internet, an intranet, and an extranet, a wireless communication network, or a combination thereof. In addition, the program may be carried over a carrier wave.

Further, the program may be a portion of another program, or may be recorded on a recording medium together with a separate program. The program may be divided into plural recording mediums and recorded. In addition, the program may be recorded in any format such as compression and encryption as long as the program can be restored.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
an arrangement unit that arranges documents within a multidimensional space in accordance with features of the documents;
a clipping unit that clips a region in which the documents are distributed, from the multidimensional space in which the documents are arranged by the arrangement unit;
an extraction unit that extracts a vector indicating a closed curved surface which is the region clipped by the clipping unit; and
a retrieval unit that retrieves information corresponding to the vector extracted by the extraction unit, from a storage unit that stores the vector in the multidimensional space in association with information indicating meaning of the vector.

2. The information processing apparatus according to claim 1, further comprising a presentation unit that presents the information retrieved by the retrieval unit.

3. The information processing apparatus according to claim 1, wherein the extraction unit generates an expression indicating the closed curved surface which is the region clipped by the clipping unit, extracts a coefficient of the expression as an element of the vector, and normalizes the vector.

4. The information processing apparatus according to claim 1, further comprising a registration unit that receives the information corresponding to the vector and registers the information corresponding to the vector in the storage unit.

5. A non-transitory computer readable medium storing a program causing a computer to function as:
an arrangement unit that arranges documents within a multidimensional space in accordance with features of the documents;
a clipping unit that clips a region in which the documents are distributed, from the multidimensional space in which the documents are arranged by the arrangement unit;
an extraction unit that extracts a vector indicating a closed curved surface which is the region clipped by the clipping unit; and
a retrieval unit that retrieves information corresponding to the vector extracted by the extraction unit, from a storage unit that stores the vector in the multidimensional space in association with information indicating meaning of the vector.

* * * * *